May 28, 1968  L. W. BRUTTING  3,385,094
SINGLE STAGE PRESSES

Filed July 9, 1965  4 Sheets-Sheet 1

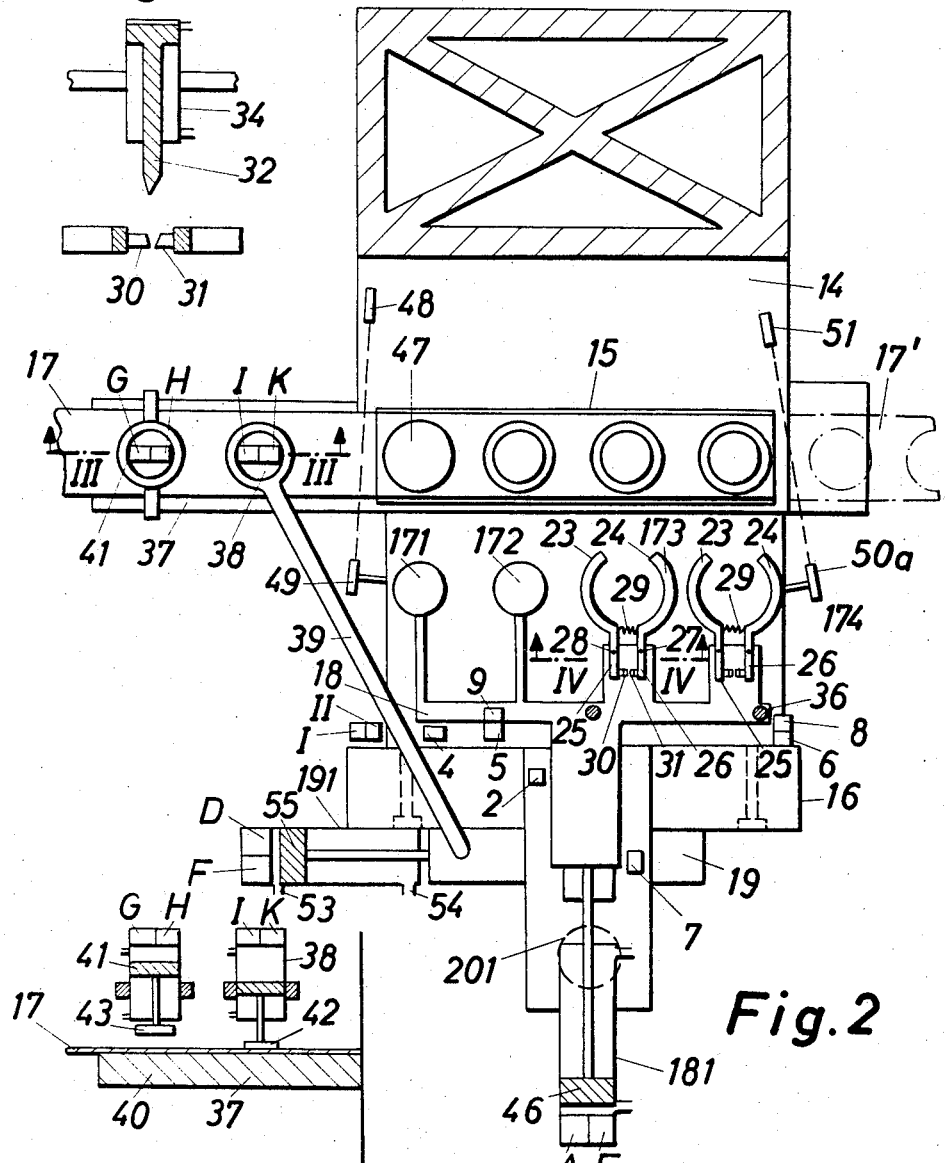

United States Patent Office 3,385,094
Patented May 28, 1968

3,385,094
SINGLE STAGE PRESSES
Ludwig Wilhelm Brutting, 36 Grillenberger St.,
Zirndorf, near Nurnberg, Germany
Filed July 9, 1965, Ser. No. 470,870
12 Claims. (Cl. 72—419)

ABSTRACT OF THE DISCLOSURE

A single stage press is combined with a strip feeder and workpiece conveyor for feeding sheet material to the press and for advancing the workpieces formed from the strip sequentially to a series of work stations. The workpiece conveyor includes a plurality of workpiece clipping means which are movable simultaneously on the independent and mutually perpendicular axes.

---

This invention relates to a single-stage press, for shaping for example metal foils, tin plate and like metal strip, having a ram driveable through a pin clutch.

In sheet-metal forming a desired finished shape workpiece in most cases cannot be produced in a single press stage either for technological reasons or owing to tool configuration. Consequently, the workpiece is worked in several presses in succession with different tools until it reaches its final shape.

A technique of this kind of course requires a number of presses corresponding to the number of required operational steps, each press requiring a corresponding emplacement. Another consideration of importance is the movement of material between the individual presses, each of which requires an operator.

In recognition of these drawbacks, the object of the present invention is to construct a conventional single-stage press in such a manner that it becomes capable of producing a workpiece necessitating several press stages.

This is achieved according to the invention by means of a multi-stage tool and a transport device for the foils to be processed having retaining means in a number which at least equals the number of the stages of the multistage tool, wherein the transport device is controllable in dependence of the movements of the ram.

This construction in a single-stage press completely avoids the drawbacks mentioned above. The only expenditure involved is the purchase price of a single press so that the cost involved in acquiring additional presses is saved while already available presses can be freed for other work. The space saved in comparison with conventional installations is another advantage. Furthermore, only one operator is required for the single press, and the hitherto necessary transport work between several presses is completely eliminated.

A particularly simple embodiment of the transport device consists in constructing the holders as grips movable by means of a horizontal-, a vertical- and a transverse-carriage in three dimensions. It is also advantageous to have the grips movable by stages forwards and back in transport direction along the multi-stage tool. In this manner, the workpieces located on the individual tools of the multi-stage tool are moved forward by one stage in each case to the next tool; the workpiece located on the last tool and which has been finished is then ejected in this transport operation.

The interdependent control of the transport device and the ram is such, that the ram during its upward movement into the rest position actuates the drive of the transport device, while the latter on returning into its rest position in turn energizes the drive of the ram.

It is further provided in accordance with the invention that the drive of the transport device and the drive of the grip is constituted by mechanical, pneumatic, magnetic and/or hydraulic means. If, for example, the transport device and the grips are driven by pneumatic means, they can be supplied from a common compressed air source.

If the workpieces are to be given a bowl- or pot-shape, which is most frequently the case, the grips are preferably constructed as claws or forks. At the stage where the sheet to be shaped has not yet been worked so far that it could be reliably seized by forks or claws of this kind, the grips can be replaced by electromagnets.

According to another feature of the invention, the claws are held open in the rest position by the force of a spring and can be closed for seizing the sheet by means of a pneumatically actuated wedge. It is furthermore advisable to provide the claws with bearing surfaces for the wedge.

The spatial arrangement of these claws may be such, that they each consist of two grip elements terminating in a pivotal spar, which spars in turn are horizontally movably joined to the transverse-motion carriage substantially at the centre of the latter, where in the region of the two grip-side ends a compression spring is provided while on the two free ends the bearing surfaces are arranged facing each other.

To effect the closing of these claws, i.e. on seizing a work-piece, a wedge is pressed between the two bearing surfaces, whereby the grip elements close on the end opposite to the arrester surfaces. During the transport operation proper the wedges remain between the bearing surfaces. The wedges are removed from between the claws only after the workpiece has been deposited on the next following tool, whereupon the claws open and release the workpiece.

According to a further feature of the invention, a strip feeding device is provided. A fully automatic strip feed can be realized when the strip feeder is provided with two alternately operable transport grips, one of which is stationary while the other is movably arranged on the horizontal-movement carriage of the transport device. In this manner, the strip feeder is caused to conform to the movements of the transport device and thus also to the movements of the press, so that it does not require a separate drive.

According to yet another feature of the invention, the association of the strip feeder device with the press is effected in the manner such that during the transport movement, the movable transport grip seizes the strip while the stationary grip is open. Then during return movement of the transport device the movable transport grip is open and the stationary grip holds the strip in position. In this manner, an exact strip advance is ensured, while on the other hand during the retractive movement of the transport device the strip remains stationary in spite of the resulting frictional forces.

It is within the scope of the invention to render controllable the transport device and the strip feeder by means of contact switches projecting into the range of movement of the transport device and of the ram. An especially advantageous embodiment of this arrangement consists in arranging a switch in the region of the ram which, during upward movement of said ram, closes the circuit controlling the transport device and the strip feeder, while on completion of the transport movement a terminal switch actuated by the transport device initiates the downward movement of the ram.

It is also within the scope of the invention to construct the transport device and the strip feeder as an additional assembly which is releasably arranged on the single-stage press. In this manner there is created the possibility of associating with a single-stage press an additional assembly comprising in each case a number of grips corresponding to the number of operational steps and to adapt these to the requirements prevailing in each case.

Additional advantages result when the working movement of the ram and of the transport device are controlled by means of at least one photocell. This further development is advantageously realized by arranging a photocell between the strip feeder and the transport device which on being interrupted cuts the circuit of the ramp drive, and that a further photocell arranged behind the transport device cuts the circuit of the transport device in the absence of a finished shaped piece which has to be ejected. This second photocell is accordingly so arranged that it must be interrupted at the end of each working cycle of the transport movement in order that it be prevented from cutting the circuit of the transport device.

A preferred embodiment of the invention is hereinafter more fully described with reference to the accompanying diagrammatic drawings, wherein:

FIG. 2 is a section along the line II—II of FIG. 1 also with parts shown in section;

FIG. 3 is a partial section along the line III—III of FIG. 2;

FIG. 4 is a partial section along the line IV—IV of FIG. 2;

Figure 1:
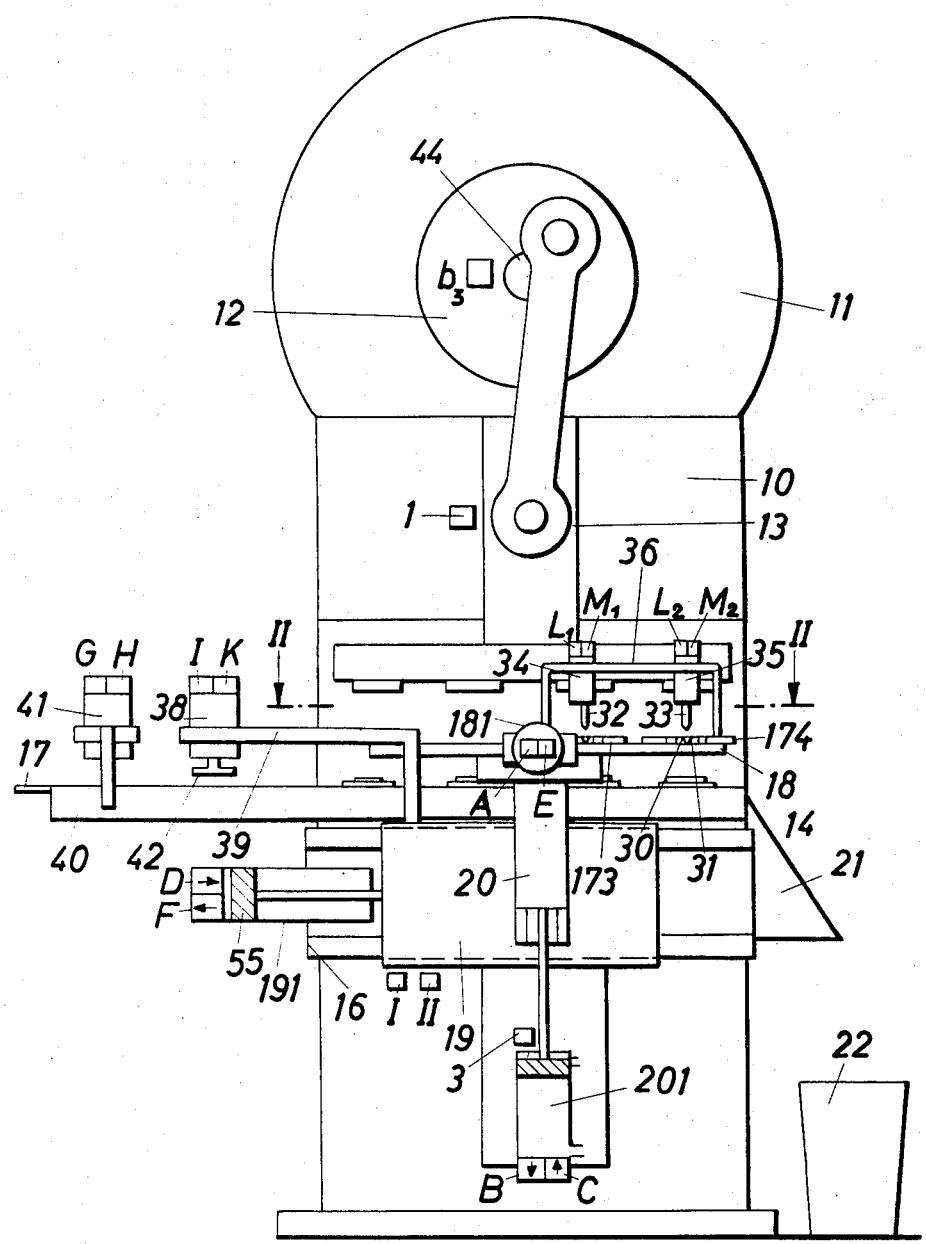
FIG. 1 shows a front elevation of a press with some parts shown in section.

At the head of the single-stage press, designated as a whole by the reference 10, there is mounted the flywheel 11 driven by an electric motor (not shown). This motor drives the ram 13 through a known and therefore not described pin clutch 12.

To the ram 13 there is fastened the upper portion of a multi-stage tool having four stages, which during the pressing operation, i.e. on lowering the ram, co-operates with the counter-piece arranged on the press table 14.

Substantially at the level of the press table 14, there is mounted the transport device 16 for the strip 17 to be worked. The fastening of such device is preferably releasable, so that a transport device adapted to the tools to be used can be mounted.

The transport device 16 essentially consists of the grips 171, 172, 173 and 174 (see also FIG. 4). These grips are arranged on a traverse 18, which in turn rests on a vertical support 20. The vertical support 20 is arranged on a horizontal support 19. The traverse 18, the horizontal support 19 and the vertical support 20 are longitudinally displaceable by means of the associated pressure cylinders 181, 191 and 201, respectively. The pistons of these pressure cylinders can be acted on by a pneumatic or hydraulic pressure medium. In the example illustrated, the pressure cylinders are operated by pneumatic medium by reason of the working speed desired. Owing to the mounting on the aforementioned three supports, the grips 171–174 can be moved in three dimensions.

By means of the switches 1 to 9 as well as I and II which as a rule, are arranged at the terminal points of the paths of movement of the moving parts, the compressed air feed to the pressure cylinders 181, 191 and 201 can be controlled through the solenoid-operated valves A–F in such a manner, that the foils to be worked which rest as workpieces on the lower tool portion 15 are moved by a stage to the next pressing process.

After four working strokes of the ram 13, each of which is followed by a working movement of the transport device, the finished workpiece is ejected through the slide 21 into the collecting container 22.

Referring to FIG. 2, the movement sequence of the transport device is as follows:

The grips 171–174 move from their rest position shown in FIG. 2 over the lower tool portion 15, sink on the four work-pieces located on this tool portion 15, seize them, lift them off the tool; the grips then move in the direction of transport, so that the individual work-pieces come to be located above the next tool stage. The grips sink on the tool portion 15, release the work-pieces, rise again, whereupon they return into their initial or rest position by executing a vertical and a retractive movement parallel to the work-pieces. These two last-mentioned movements preferably overlay to save time, so that the grips or the transverse and horizontal support reach their initial position by moving along a diagonal path.

In the embodiment according to FIGS. 1 and 2, the four grip elements 171 to 174 consist of two electromagnets and two clamps. The electromagnets 171 and 172 are excited on coming into contact with the work-pieces located on the lower tool portion 15 and attract these work-pieces; they are again de-energized after the transport movement and release the work-pieces on the next following tool.

The two clamps 173 and 174 each consist of two symmetrical grip elements 23 and 24, which terminate in pivot members 25 and 26. The latter are hinged to the transverse support 18 at 27 and 28 respectively, i.e. substantially at midpoint. At the point where the substantially circular grip elements 23, 24 merge into the pivot members 25, 26, there is located a compression spring 29, so that in the rest state the clamps 174 and 173 are open. Substantially in the region of the free end of the pivot members 27 and 28 there are provided the bearing surfaces 30 and 31 for the wedge 33, with the aid of which the clamps 173 and 174 can be closed. Thus, by inserting a wedge between the arrester surfaces 30 and 31 and pivoting about the hinge points 27 and 28 the clamp 174 or 173 can be closed. A separate wedge 32, 33 is provided for each of the clamps 173 and 174.

The wedges are operated, similarly the supports, by means of the pneumatic pressure cylinders 34 and 35, to which compressed air is admitted through the solenoid-operated valves L, M. The control of these valves L, M and the excitation and de-energisation of the electromagnets 171 and 172 is assured by switches I and II likewise arranged within the path of movement of the transport device.

The pressure cylinders 34 and 35 of the wedges 32 and 33 are fastened to the support 36, which in turn is arranged on the horizontal support 18, so that it accompanies the aforementioned pressure cylinders 34 and 35 in their movements and therefore do not execute relative movements in relation to the clamps 173 and 174. Wedges 32 and 34 are therefore always located above the bearing surfaces 30 and 31.

A strip feeder device 37 is coupled with the horizontal support 19 of the transport device 16, which feeds the foil or sheet strip 17 to the press at a rate corresponding to the working rhythm of the transport device. A pneumatic cylinder 38 is connected through the extension 39 to the horizontal support 19, accompanying said support in its horizontal movements.

The sheet guide path 40 of the feeder device designated as a whole by the reference 37 further carries the pneumatic pressure cylinder 41 (see also FIG. 3). These cylinders 38 and 41 are also provided with two solenoid-operated valves each, namely G, H, and I, K, which are connected to switches 1 to 9 and are thus actuated in dependence of the movements of the transport device.

Here, the circuit of the solenoid-operated valves G, H, I, K is so laid out, that a movement of the horizontal support 19 in transport direction causes the punch 42 to press against the sheet strip located underneath and take these along, while simultaneously the punch 43 of the cylinder 41 is raised and thus releases the strip. Inverse conditions prevail during the return movement of the horizontal support 19, so that the punch 42 is raised while the punch 43 presses against strip and holds it in position.

The arrangement of the switches 1 to 9 and I, II depends on the spatial configuration of the single-stage press in each case, and on the transport device and can be determined arbitrarily, at least to a certain extent. The only essential consideration is that each switch must be actuated at the correct instant. This can be achieved by a suitable constructed cam or stop which is fast with the moving support.

Figure 6:
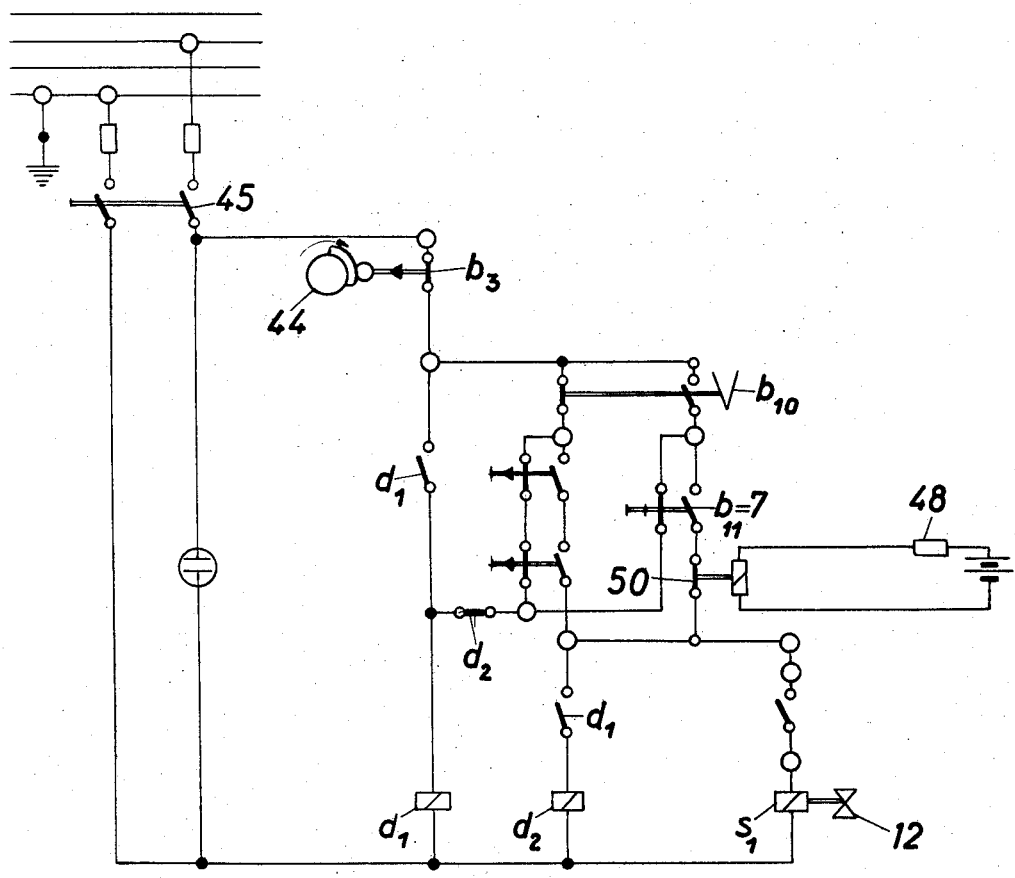
FIG. 6 is a circuit diagram of the safety control of the operation of the press.

FIG. 6 illustrates a per se known safety circuit for presses and similar machine tools in the rest state. It can be switched to automatic operation by manual actuation of the switch $b_{10}$. In the present case, the control is set for automatic operation. In order to activate the electromagnet $s_1$ and thereby the associated pin clutch 12, thus initiating a pressing operation by the ram 13, the switch $b_{11}$ has to be actuated. Thus, when the switch $b_{11}$ is actuated, all relays $d_1$ and $d_2$ will respond and will be energized. The pin clutch 12 is then activated in this manner by the now energized electromagnet $s_1$, and the shaft 44 carries out a rotation. This shaft 44 is the drive shaft of the flywheel 11. Appropriate brakes are provided to ensure that the shaft 44, with which the ram 13 is connected, rotates only once. Since however during this one rotation the control circuit of the press 10 according to FIG. 6 is interrupted by the cam switch $b_3$ co-operating with the shaft 44, the control circuit is cut, so that the relays $d_1$ and $d_2$ are again released.

A new ram stroke can take place only when the switch $b_{11}$ is again closed. It is obvious that the control circuit can become effective only when the main switch 45 is closed.

The control of the transport device and of the strip feeder is coupled with the working stroke of the single-stage press through the aforementioned switch $b_{11}$. Switch $b_{11}$ in FIG. 6 is identical with the switch 7 of FIG. 5. Thus, as will be explained hereinafter, the single-stage press is activated through the switch 7, while the switch 1, arranged with the path of movement of the ram 13 initiates the working stroke of the transport device. The transport device operates as follows:

On returning into the initial position, substantially shown in FIG. 1, after a pressing stroke, the ram 13 actuates through a cam or the like the switch 1. The current pulse thereby released opens the solenoid-operated valve A, whereby compressed air is admitted into the pressure cylinder 181. Since this pressure cylinder 181, just like the pressure cylinders 191, 201, 34, 35, 38 and 41 are stationary in axial direction, the transverse support 18 is moved by the piston 46 over the lower tool portion 15. Substantially at the end of its movement the transverse support 18 actuates through a cam the switch 2, whereupon the current pulse generated opens the solenoid-operated valve B of the pressure cylinder 201 of the vertical support; the support 18 is lowered together with the horizontal support 19, so that the clamps 171 to 174 come to rest against the workpiece located on the tool portion 15. By this lowering of the transverse support the switches 3 and I are actuated through two separate cams. Switch I energizes the two electromagnetic clamps 171 and 172, so that they attract the iron workpieces; simultaneously, the current released by switch I opens the solenoid operated valves $L_1$ and $L_2$ of the pressure cylinders 34 and 35, whereby the wedges 32 and 33 are moved downwards between the bearing surfaces 30 and 31 and the clamps 173 and 174 are closed against the force of the compression springs 29, so seizing the workpiece located between them. As already mentioned, switch 3 opens at about the same time the solenoid operated valve C, and the clamps 171–174 rise vertically from the tool part 15, taking along the workpieces.

Substantially at the end of this upward movement, the switch 4 is actuated by a cam or stop on the vertical- or on the horizontal-support. The switch 4 opens the solenoid-operated valve D, so that compressed air flowing into the pressure cylinder 191 moves the transport device 19 in transport direction by one tool stage, when the clamps proceed to the next tool of the part 15 in relation to their initial position. In this position, a cam located on the horizontal support 19 actuates the switch 5 which, by opening the solenoid-operated valve B, results in a lowering of the vertical support 20 and thereby of the clamps 171–174.

At the end point of the downward movement of the vertical support 20, the switches II and 3 are actuated. The switch II cuts the circuit of the electromagnets associated with the clamps 171 and 172, so that their magnetic field fades and the corresponding workpieces are deposited. The wedges 32 and 33 are drawn back by reversal of the compressed air stream in the cylinders 34 and 35 due to opening the parallel-connected solenoid-operated valves $M_1$ and $M_2$, so that said wedges move upwards from between the bearing surfaces 30 and 31, whereby the compression springs open the clamps 173 and 174, and the workpieces held by them are deposited. The fading of the magnetic fields of the electromagnets of grips 171 and 172 and the opening of the clamps 173 and 174 are substantially simultaneous.

The switch 3 actuated at about the same time as the switch 11 effects, as already mentioned, the opening of the solenoid-operated C, whereby the grips are vertically raised by the co-ordinated movement of transverse support 18, horizontal support 19 and vertical support 20 away from the tool and the work-pieces.

At the end point of this vertical movement the switch 6 is actuated. The pulse released by the switch 6 is fed to the solenoid-operated valves E, F of the pressure cylinders 181 and 191, due to which the grips 171–174 move away in vertical direction from the part 15, while simultaneously the horizontal support 18 executes a movement in direction opposite to the transport direction. These two movements overlap, due to which the grips 171–174 describe a trajectory resulting from the two aforementioned mutually perpendicular movements of the transverse support 18 and of the horizontal support 19.

Figure 5:
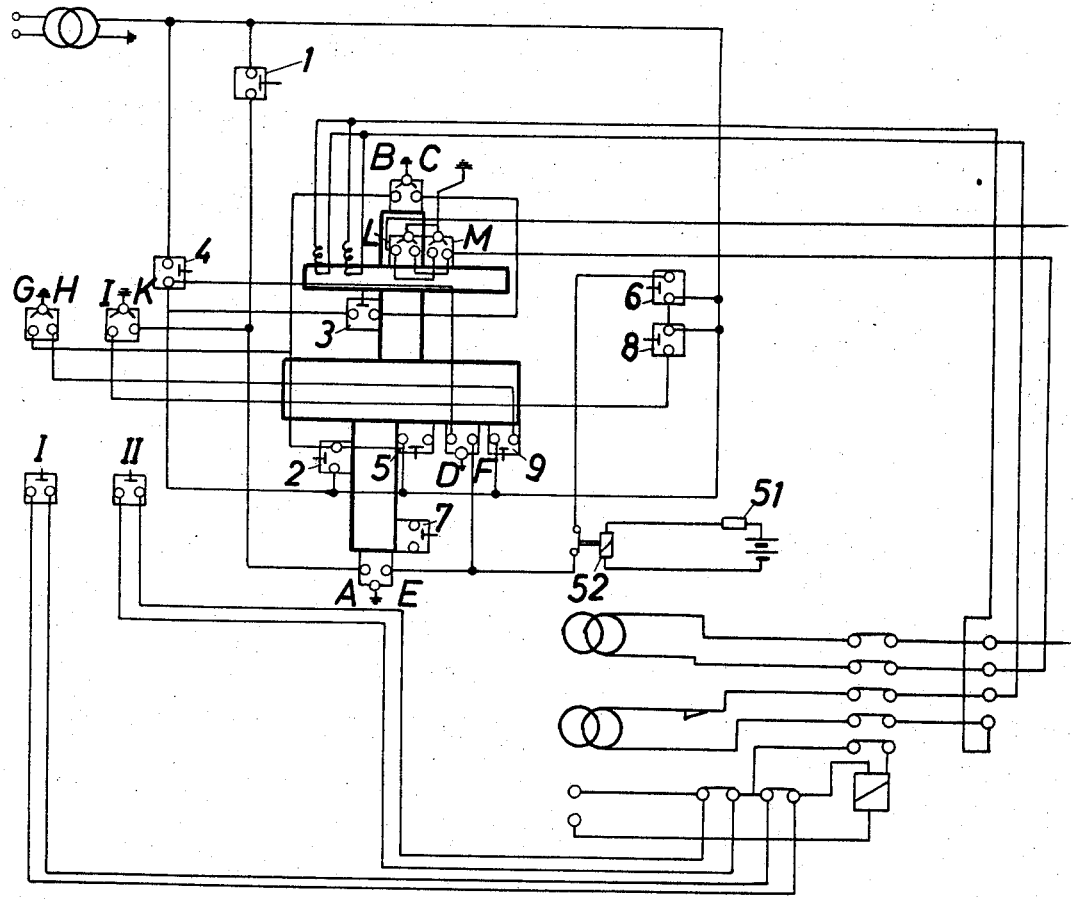
FIG. 5 illustrates the circuit diagram of the transport device.

Likewise at the end point of the trajectory of the transverse support 18, switch 7 of FIGS. 2 and 5 is actuated. As already mentioned, this switch is identical with switch $b_{11}$ of FIG. 6, so that the control circuit of the press 10, according ot FIG. 6, is closed.

Following this, the ram 13 executes the previously described working stroke and returns into the position shown in FIG. 1, which substantially coincides with the initial position.

In this high position the ram 13 actuates again the switch 1 and the aforedescribed operating sequence of transport device 16 and press 10 is repeated.

In the embodiment illustrated, the transport device is coupled with a strip feeder 37.

Here, the solenoid-operated valve K is actuated simultaneously with the solenoid-operated valve A by the switch 1, whereby the punch 42 is pressed against the strip 17 located underneath. Following this, the switch 2 actuates the solenoid-operated valve G of the pressure cylinder 41, so that its punch 43 moves away from the strip 17. In the subsequent horizontal movement of the clamps 171–174 in transport direction, the metal strip 17 is therefore moved in transport direction by one tool stage and is fed to the first tool stage, i.e. to the tool stage located opposite to grip 171 in FIG. 2.

Within the range of movement of the vertical support 20 there are additionally arranged the switches 8 and 9, which can be operated substantially simultaneously with the switches 5 and 8. Thus, after execution of the horizontal movement in transport direction, the electric pulse generated by actuation of the switch 9 causes compressed air to flow through the solenoid-operated valve A into the pressure cylinder 41 in such a manner, that its piston 43 immobilizes the strip 17 on the feed path 40, while through the switch 8 the solenoid-operated valve is opened, so that the compressed air thereby admitted to the pressure cylinder 38 raises the punch 42 and releases the metal strip 17. Consequently, said strip is secured against displacement during return movement of the horizontal support 19.

The tool 47 which, according to FIG. 2, is located opposite to the grip 171 stamps a corresponding shape out of the metal strip 17, which piece is then further processed by the next three tools. The remaining metal strip 17' leaves the press substantially in the form indicated by broken lines. From here, it can be fed to a cutter or the like.

In addition, two photocells are provided for supervising the work of the press 10 and of the transport device 16. The light beam of the lamp 49 is directed on the selenium cell 48 located on the other side of the metal strip. If now owing to an irregularity of the process the strip 17 moves out of the horizontal, it will interrupt the light beam, and the switch 50 (see FIG. 6) is opened by a relay connected to the selenium cell 48. As a result, the control circuits of the press will be interrupted and the ram 13 immobilized.

A second photocell is provided at the end of the press, at the workpiece discharge. A lamp 50a directs its beam to the selenium cell 51 located on the other side of the tool. Here, the circuit has been so laid out, that a relay linked with the selenium cell 51 co-operates with a switch 52 arranged between the switch 6 and the solenoid-operated valve E. In order that the switch 52 may remain closed, a workpiece must pass the photocell 50–51 after each ejecting movement of the clamp 174. If, owing to defective functioning of the transport device 16, this is not the case, then the transport device as well as the press is stopped by the switch 52.

As can be gathered from the preceding description, the switches 1 to 9 can be activated only for operations in a certain direction. When actuated in the opposite direction, no switching impulse will be produced.

The arrows drawn in the solenoid operated valves of FIGS. 1–4 indicate the direction of movement of the pistons of the pressure cylinders, initiated by actuation of the corresponding solenoid operated valves.

Since the drawings, as already stated, are a purely diagrammatical illustration, the compressed air feed lines to the individual pressure cylinders as well as the electric leads to the electromagnets and to the individual switch elements are not shown in FIGS. 1–4, in order to present the essential features more clearly.

To complete the description, the mode of functioning of the solenoid operated valves will now be explained with reference to the pressure cylinder 191 in FIG. 2. The solenoid operated valve D controls the air admission conduit 53, while the solenoid-operated valve F controls the admission conduit 54. This valve F is opened by actuation of a switch linked with, e.g., electrovalve D, so that compressed air flows in through the conduit 53 and moves the piston 55 in the direction of the arrow drawn in the solenoid-operated valve D. The air located in the chamber corresponding to the air admission conduit 54 escapes during this movement of the piston 55 through a separate outlet valve (not shown). The cylinder chamber corresponding to the exhaust conduit 53 also has an exhaust valve of this kind.

The admission conduits 53 and 54 are connected to a compressor, which produces a pressure of, say, 6 atmospheres absolute. This pressure is maintained by a separate control valve.

The invention is of course not limited to the form of embodiment hereinbefore described as numerous modifications are possible. Thus, for example, it is possible to adapt the number and type of the grip elements 171–174 to particular requirements, i.e., to the number of the working stages and to the desired pressed product.

When processing pre-stamped plates, the strip feeder can of course be dispensed with. In this case, it is advisable to provide the transport device with an additional grip element, e.g., an electromagnet, which then lifts the plates off a stack located in front of the press and feeds them to the first tool. In this case therefore the transport device has one grip element more than there are tool stages.

What is claimed is:

1. In combination with a one stage press for the shaping of workpieces from metal strip, said press including a ram actuated from a one revolution clutch and a tool for forming the workpieces from the strip, conveying means controlled by the press ram for transporting the workpieces to and between a plurality of work stations, said conveying means including a plurality of work gripping members, and means including a horizontally movable support, a vertically movable suport and a transversely movable support for moving said work gripping members simultaneously on three mutually perpendicular independent axes.

2. The combination defined by claim 1 and including a strip feeder associated with said conveying means and wherein the assembly of said conveying means and said strip feeder is releasably connected to said press.

3. The combination defined by claim 1 in which at least one of said work gripping means comprises an electromagnet.

4. The combination defined by claim 1 in which at least one of said work gripping means comprises a pair of fork-like members normally biased to open position and including wedging means for urging said members toward each other against the biasing force.

5. The combination defined by claim 4 in which said fork-like members include arrester surfaces for said wedging means.

6. The combination defined by claim 4 wherein said fork-like members are each pivotally mounted substantially at the centers thereof on a horizontally movable transverse slide, and wherein spring means are disposed between the ends of said fork-like members opposite to their work engaging ends to bias the work engaging ends to open position.

7. The combination defined by claim 2 in which said strip feeder includes two alternately operating grips, one of which is stationary and the other of which is mounted for movement on the horizontal movable support of said conveying means.

8. The combination defined by claim 7 including grip controlling means for causing said movable grip to engage the strip during feeding movement of said conveying means and for releasing said movable grip and causing said stationary grip to engage the strip during return movement of said conveying means.

9. The combination defined by claim 8 in which said grip controlling means comprises electrical switches positioned to be actuated by movement of the conveying means and the press ram.

10. The combination defined by claim 9 in which one of said switches is positioned to be actuated by upward movement of the press ram for initiating movement of the strip feeder and conveying means and another of said switches is positioned to be actuated by terminal movement of said conveying means to initiate the working stroke of the press ram.

11. The combination defined by claim 2 including photoelectric means positioned to sense vertical deviations of the travel of the strip and control means interconnected between said photoelectric means and said press for stopping the press whenever said strip rises above the conveying means.

12. The combination defined by claim 2 including photoelectric means positioned to sense the absence of a workpiece ejected from the press for each cycle of operation and control means interconnected between said press and said photoelectric means for stopping the press whenever there is a failure of a workpiece to eject from the press during each cycle thereof.

(References on following page)

References Cited

UNITED STATES PATENTS

| | | | |
|---|---|---|---|
| 1,996,818 | 4/1935 | Marshall | 72—421 |
| 3,057,312 | 10/1962 | Hatch | 72—421 |
| 3,124,270 | 3/1964 | Tidball. | |
| 3,138,978 | 6/1964 | Riemenschneider | 72—421 |
| 3,282,079 | 11/1966 | Kull | 72—421 |

CHARLES W. LANHAM, *Primary Examiner.*

G. P. CROSBY, *Assistant Examiner.*